United States Patent
Li

(10) Patent No.: US 9,432,750 B1
(45) Date of Patent: Aug. 30, 2016

(54) CONTENTIONLESS N×M WAVELENGTH CROSS CONNECT

(71) Applicant: WAVEXING, INC., San Jose, CA (US)

(72) Inventor: Fenghua Li, San Jose, CA (US)

(73) Assignee: Wavexing, Inc., San Jose, CA (US)

( * ) Notice: Subject to any disclaimer, the term of this patent is extended or adjusted under 35 U.S.C. 154(b) by 0 days.

(21) Appl. No.: 14/257,846

(22) Filed: Apr. 21, 2014

Related U.S. Application Data

(60) Provisional application No. 61/814,018, filed on Apr. 19, 2013.

(51) Int. Cl.
*H04B 10/00* (2013.01)
*H04Q 11/00* (2006.01)

(52) U.S. Cl.
CPC ... *H04Q 11/0005* (2013.01); *H04Q 2011/0015* (2013.01); *H04Q 2011/0022* (2013.01); *H04Q 2011/0041* (2013.01); *H04Q 2011/0058* (2013.01)

(58) Field of Classification Search
CPC .................................................. H04J 14/0212
USPC ....................................................... 398/82–88
See application file for complete search history.

(56) References Cited

U.S. PATENT DOCUMENTS

| | | | | |
|---|---|---|---|---|
| 4,786,124 A * | 11/1988 | Stone et al. | ................ | 359/15 |
| 5,414,540 A * | 5/1995 | Patel et al. | ................ | 349/196 |
| 5,771,320 A * | 6/1998 | Stone | ................ | 385/16 |
| 6,157,427 A * | 12/2000 | Saynor et al. | ................ | 349/123 |
| 6,285,500 B1 * | 9/2001 | Ranalli et al. | ................ | 359/245 |
| 6,327,019 B1 * | 12/2001 | Patel et al. | ................ | 349/196 |
| 6,529,307 B1 * | 3/2003 | Peng et al. | ................ | 359/256 |
| 6,532,318 B1 * | 3/2003 | Brophy et al. | ................ | 385/17 |
| 6,535,311 B1 * | 3/2003 | Lindquist | ................ | 398/82 |
| 6,606,197 B2 * | 8/2003 | Amin et al. | ................ | 359/618 |
| 6,665,460 B2 * | 12/2003 | Derventzis et al. | ............. | 385/16 |
| 6,941,073 B2 * | 9/2005 | McGuire | ................ | 398/84 |
| 6,956,987 B2 * | 10/2005 | Doerr | ................ | 385/17 |
| 7,031,573 B2 * | 4/2006 | Volodin et al. | ................ | 385/37 |
| 7,106,966 B1 * | 9/2006 | Lalonde et al. | ................ | 398/46 |
| 7,277,640 B2 * | 10/2007 | Stone | ................ | 398/84 |
| 7,292,786 B1 * | 11/2007 | Barbarossa et al. | ............. | 398/83 |
| 7,468,840 B2 * | 12/2008 | Cohen et al. | ............. | 359/489.08 |
| 7,822,303 B2 * | 10/2010 | Cohen et al. | ................ | 385/18 |
| RE42,540 E * | 7/2011 | Iazikov et al. | ................ | 385/24 |
| 8,045,854 B2 * | 10/2011 | Colbourne | ................ | 398/48 |
| 8,121,482 B2 * | 2/2012 | Khan | ................ | 398/83 |
| 8,305,523 B2 * | 11/2012 | Escuti et al. | ................ | 349/96 |

(Continued)

*Primary Examiner* — Agustin Bello
(74) *Attorney, Agent, or Firm* — Perkins Coie LLP

(57) ABSTRACT

Technology for a contentionless N×M wavelength cross connect (WXC) device is disclosed herein. The WXC device includes multiple input and output wavelength dispersive elements and a cross connect assembly. The cross connect assembly includes multiple rows of incoming ports. For each individual wavelength of different wavelengths, split optical beams of the individual wavelength from the input wavelength dispersive elements reach a row of incoming ports corresponding to the individual wavelength. The cross connect assembly further includes transmissive active switching elements and multiple rows of outgoing ports. The transmissive active switching elements configured to dynamically establish at least one optical path between an incoming port within the row of incoming ports corresponding to the individual wavelength and an outgoing port within a row of output ports corresponding to the individual wavelength.

15 Claims, 7 Drawing Sheets

(56) References Cited

U.S. PATENT DOCUMENTS

| | | | |
|---|---|---|---|
| 8,565,600 B2* | 10/2013 | McGreer et al. | 398/68 |
| 2002/0131683 A1* | 9/2002 | Doerr | 385/19 |
| 2004/0062475 A1* | 4/2004 | Popovich et al. | 385/27 |
| 2004/0190901 A1* | 9/2004 | Fang | 398/59 |
| 2005/0036202 A1* | 2/2005 | Cohen et al. | 359/495 |
| 2005/0105909 A1* | 5/2005 | Stone | 398/87 |
| 2006/0013587 A1* | 1/2006 | Scott et al. | 398/83 |
| 2007/0172240 A1* | 7/2007 | Terai et al. | 398/83 |
| 2008/0031627 A1* | 2/2008 | Smith et al. | 398/83 |
| 2010/0225856 A1* | 9/2010 | Escuti et al. | 349/96 |
| 2010/0231847 A1* | 9/2010 | Escuti | 349/201 |
| 2011/0163671 A1* | 7/2011 | Chen et al. | 315/82 |
| 2012/0020664 A1* | 1/2012 | Sakurai et al. | 398/50 |
| 2012/0057869 A1* | 3/2012 | Colbourne | 398/49 |
| 2012/0154893 A1* | 6/2012 | Hotta | 359/278 |
| 2013/0202246 A1* | 8/2013 | Meade et al. | 385/14 |
| 2013/0222384 A1* | 8/2013 | Futterer | 345/426 |
| 2013/0235283 A1* | 9/2013 | Mao et al. | 349/1 |
| 2014/0126029 A1* | 5/2014 | Fuetterer | 359/3 |

* cited by examiner

CONTENTIONLESS N×M WAVELENGTH CROSS CONNECT

CROSS REFERENCE TO RELATED APPLICATIONS

This application claims the benefit of U.S. Provisional Application No. 61/814,018 entitled "Contentionless Wavelength Cross Connect", filed Apr. 19, 2013, which is hereby incorporated by reference in its entirety.

FIELD OF THE INVENTION

At least one embodiment of the present invention pertains to optical switching devices, and more particularly, to automated wavelength cross-connect devices enabling wavelength connections between optical fibers.

BACKGROUND

An optical fiber typically carries multiple spectral channels for transporting signals having different wavelengths. Each of the spectral channels has a fixed center wavelength with a bandwidth size. Each spectral channel is capable of handling and transporting separate and independent information carried in optical signals at different wavelengths. The center wavelengths of adjacent channels are spaced at a predetermined channel spacing (e.g. 50 GHz, 100 GHz or a flexible spacing). The spectral channels may be wavelength division multiplexed to create a composite multi-channel signal travelling through an optical network. At various degrees, locations, or nodes, in the optical network, one or more spectral channels may be dropped from or added to the composite multi-channel optical signal. For example, a reconfigurable optical add-drop multiplexer (ROADM) can be used as an optical multiplexer capable of adding or dropping channels at the wavelength layer.

One technique to add or drop channels of signals is to use Multicast Switch (MCS). FIG. 1 illustrates an optical switching device using MCS and optical amplifier array. The optical amplifier is an Erbium Doped Fibre Amplifier (EDFA). The 1×M (i.e., 1 input port and M output ports) MCS switch can drop any input signals from any direction (E, W, N, or S direction). However, such a device using MCS has various disadvantages. MCS introduces large insertion loss due to the broadcasting internal function. Consequently, to lower the insertion loss, the device has to use wavelength selective switches (WSS) on the route side, as shown in FIG. 1. The WSS switches increase the cost significantly. The device needs to use many WSS and many pairs of MCS and EDFA array for routing/selecting and adding/dropping optical signals. For instance, a simple 4-degree device, as shown in FIG. 1, has 8 1×23 WSS and a couple of MCS and EDFA array combinations. As a result, the device is costly and has a large size.

Another technique to add or drop channels of signals is to use reflective microelectromechanical systems (MEMS) mirror arrays. Two groups of reflective MEMS mirror arrays are used to switch optical signals by adjusting the mirror angles. Because large switching mirror angles are needed to maintain reasonable wide channel bandwidth, such a system is costly and bulky. The system is not reliable since a failure of one of the MEMS component will cause the entire system to fail.

Yet another technique to add or drop channels of signals is to use reflective LCoS chips. LCoS chips' phase modulation functions are used to control the routing of the optical signals with respective wavelengths. The phase-modulated optical signals are freely deflected by multiple small pixels. However, multiple ports usually share the same LCoS chip, which leads to serious crosstalk between these ports. The insertion loss for each port is high due to the low diffraction efficiency out of limited number of pixels to modulate the LC pixels.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

References in this specification to "an embodiment," "one embodiment," or the like, mean that the particular feature, structure, or characteristic being described is included in at least one embodiment of the present invention. Occurrences of such phrases in this specification do not all necessarily refer to the same embodiment, nor are they necessarily mutually exclusive.

An optical switching device, e.g. an optical cross connect is described herein. ROADMs using such an optical cross connect have the ability to support multi-degree capability as the optical network scales and becomes increasingly connected in a mesh network topology. Additionally, these multi-degree ROADMs can incorporate both colorless and directionless add and drop capabilities to enable dynamic adding or dropping of any set of channels from any link direction to any access port. Such colorless and directionless adding and dropping capabilities enable the operator to more efficiently utilize the tunable transponders that typically dominate the node cost, particularly when network data rates reaches 100 Gbps or even 1 Tbps.

Additionally, the capabilities provide the basic hardware for dynamic node architectures that allow for the sharing and recycling of local node resources to further cost-effectively support wavelength re-routing functions and network restoration. Also, such a device is contentionless, which allows the operators to disregard the limitation of potential blocking/contention situation of the same wavelength used in the same add/drop structure simultaneously. A true colorless, directionless, contentionless device is desired for the network for ultimate level of flexible operation, which is of great interest of carriers and equipment suppliers.

At least one of the embodiments of the disclosed technology is directed to a contentionless N×M Wavelength Cross Connect (WXC) module. Such a true colorless/directionless/contentionless (CDC) architecture for the network has an ultimate level of flexible operation. N is the number of input ports and M is the number of output ports; N and M can be the same integer number or different integer numbers. The WXC module is based on a transmissive switching core. N can be equal to M as the module does not waste any ports for the maximum ports utilization with the same cost.

Figure 2:
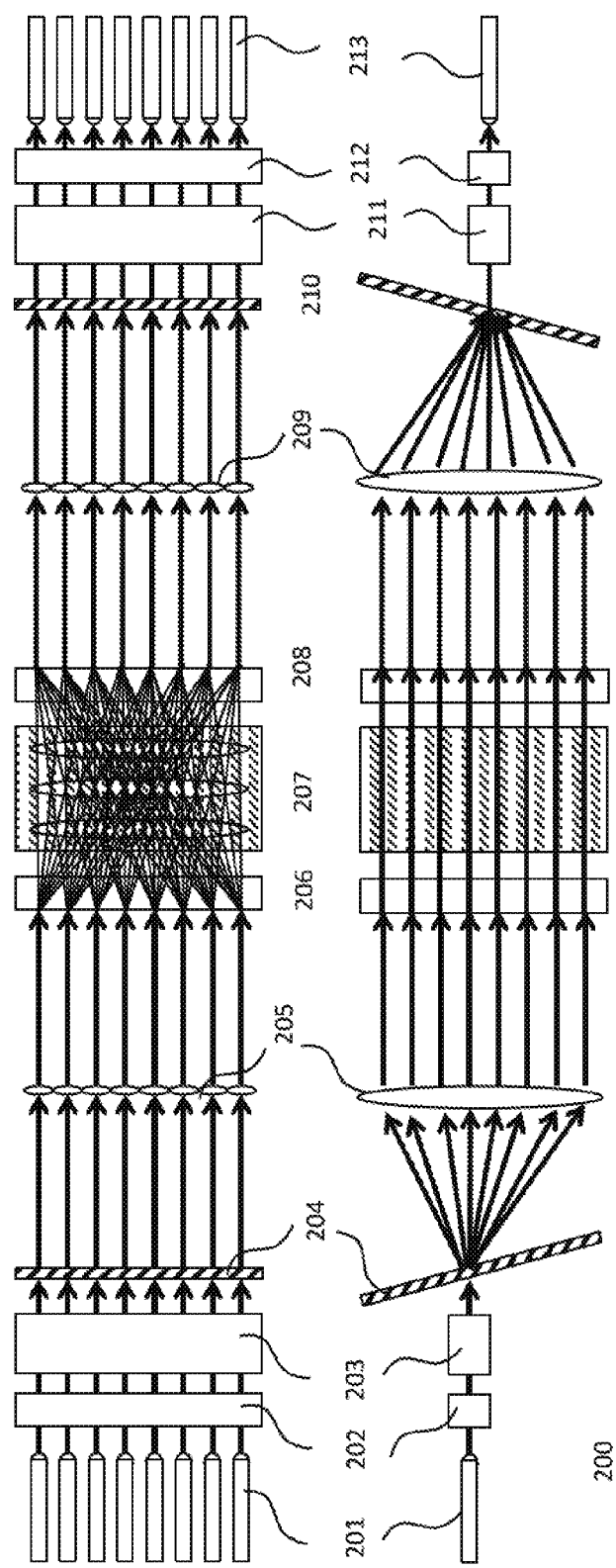
FIG. 2 is a block diagram illustrating a contentionless wavelength cross connect (WXC) module.

FIG. 2 is a block diagram illustrating a contentionless WXC module, according to at least one embodiment. Top half of the FIG. 2 shows a top view of a contentionless WXC module 200; bottom half of the FIG. 2 shows a side view of the same contentionless WXC module 200. The 8×8 WXC module 200 comprises 8 pieces of input collimators 201 and output collimators 213, polarization diverse element 202 and 212, beam expansion unit 203 and 211, wavelength dispersive elements 204 and 210 (e.g., transmissive or reflective grating), cylindrical lens arrays 205 and 209, and a transmissive WXC switching core region (206, 207 and 208).

In some embodiments, the WXC module comprises multiple input ports for receiving the input optical beams and multiple output ports for transmitting the output optical beams. The input ports include the input collimators 201 and the output ports include the output collimators 213. The collimators 201 and 213 can include one or more collimating lens. Alternatively, the collimators 201 and 213 can be replaced by optic fibers, waveguides, or other optical component to guide the optical paths of the optical signals. The wavelength dispersive element 204 can include multiple dispersive components for different wavelengths, or can be a single dispersive elements for all wavelengths.

The WXC module 200 can include two separate beam switching cores and the whole optics is transmissive all the way from input collimators 201 to output collimators 213. The beam switching cores have the contentionless capability, i.e., to independently handle same wavelength from different input ports to other output ports for the WXC module 200. As shown in the top view, the horizontal optical focus of the optical structure for different wavelengths is designed to locate in the middle of the WXC core in the wavelength plane. In other words, optical signals for one particular wavelength travel at a particular horizontal wavelength plane corresponding to that particular wavelength. The horizontal wavelength planes corresponding to different wavelengths located at different heights of the WXC core 200, as shown in the side view.

The Gaussian beam of any wavelength of the entire targeted wavelength range in the switching core region has a Raleigh length that covers the entire length from beam switching assembly 206 to beam switching assembly 208. The effective bandwidth of all channels can be optimized by the optical design. The transmissive WXC switching core region can include a middle section 207. The middle section 207 can include multiple transmissive active switching elements. The middle section 207 can further comprise special lens combination between beam switching assemblies 206 and 208 to improve the optical performance.

The transmissive WXC switching core region (206, 207 and 208) can include transmissive active switching elements, e.g., active liquid crystal based polarization grating cells; combining liquid crystal polarization controlling cells with passive liquid crystal mesogen polarization gratings; or birefringent crystals.

These cells or crystals are transmissive active switching elements, since the optical signals transmit through cells or crystals when the cells or crystals control the optical paths of the optical signals. In some other embodiments, the WXC switching core region may include one or more reflective active switching elements as well. The reflective active switching elements can include, e.g., MEMS mirror arrays or LCoS chips.

The liquid crystal cells can handle all the individual pixels from the input ports. In the case of 8×8 WXC (i.e., N=9; M=8) with 96 channels at 50 G channel spacing, the cells independently deal with 768 pixels if combining with 8 ports. For flexible bandwidth, its basic granularity channel could be 12.5 GHz, the required number of channels for 8×8 WXC is 3072.

Figure 3:
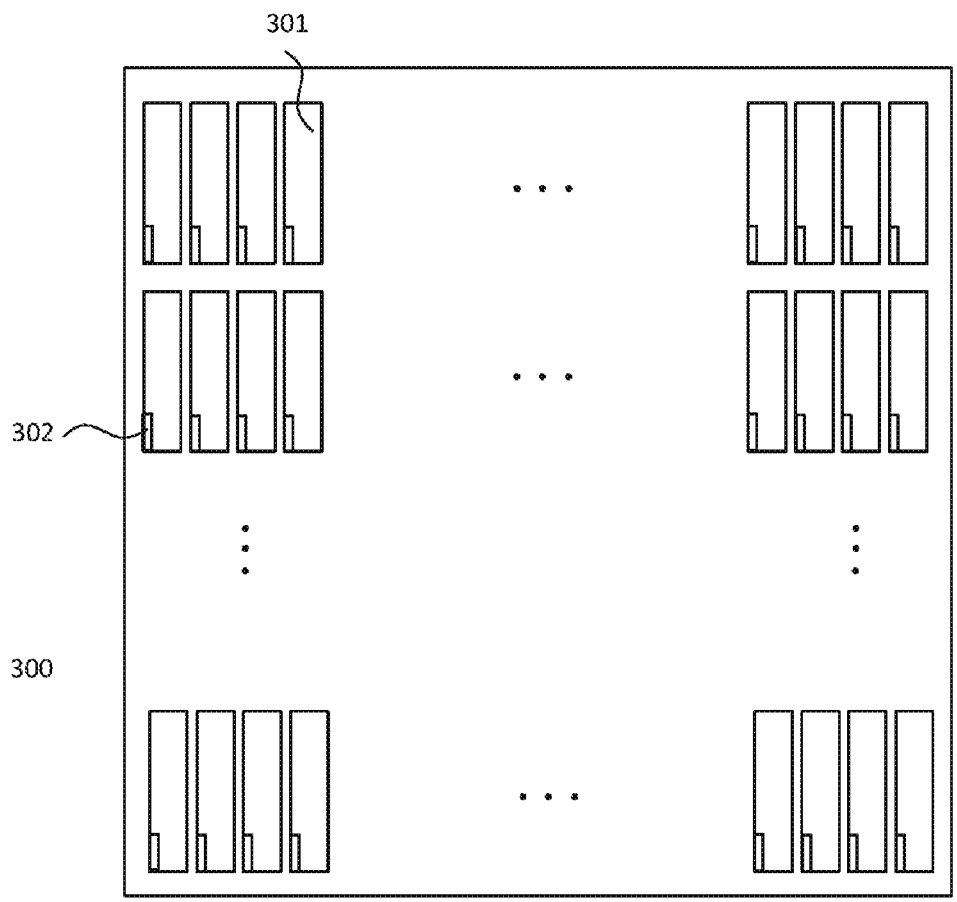
FIG. 3 is a block diagram illustrating a device including multiple thin-film transistor liquid crystal cells.

The way to handle so many electronic connections is to use customized active matrix thin-film transistor (TFT) liquid crystal cells, as shown in FIG. 3. FIG. 3 is a block diagram showing a device including multiple thin-film transistor liquid crystal cells, according to at least one embodiment. Sub-pixel 301 is the basic switching element in TFT structure and can be independently controlled to cover one single color by the TFT control electronics. The subpixel 301 can be used as the main channel for WXC switching core. Black matrix 302 is used to block the light leakage area from the TFT source and drain connection region. The customized liquid crystal (LC) cells can have thicker LC layer, e.g., at least 10 μm thick, compared to typically 3 μm LCD Fringe Field Switching (FFS) display cells. The subpixel size can be, e.g., 100 μm wide, compared to typical sizes of a few tens of μm. The customized crystal cells can include special anti-reflective (AR) coating on the external surfaces of LC cells to have the optimized transmission for the wavelengths of the signals, such as the C-band centered at 1.546 μm.

Due to the pixel structure and the port setup, the WXC module has realized the contentionless feature. Optical signals of the same or different wavelengths can enter different ports of the WXC module 200 and the signals can be handled independently and simultaneously routed into different output ports.

Figure 4:
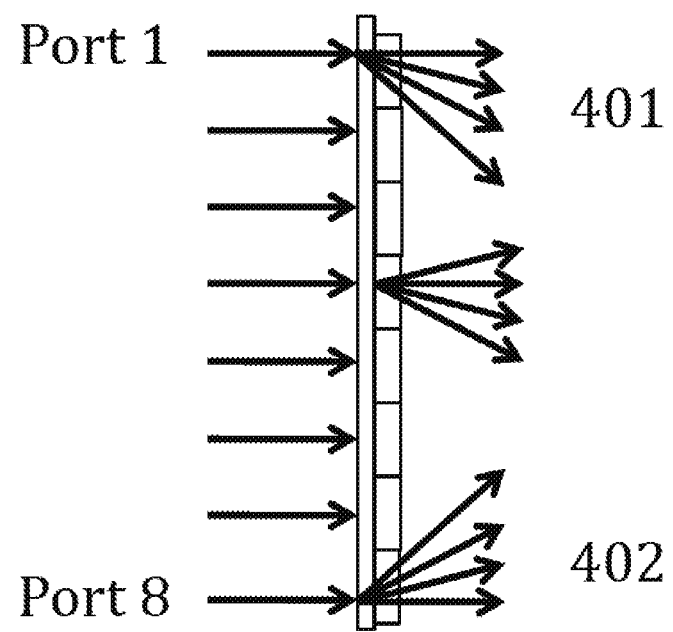
FIG. 4 is block diagram illustrating a row of array pixels.

Each port will be structured to match with each row of array pixels, as shown in FIG. 4. FIG. 4 is block diagram illustrating a row of array pixels, according to at least one embodiment. For example, port 1 can be configured differently with the beam steering from other ports, and includes switch core to route the beams group 401 onto other ports independently at a particular way; while port 8 routes beams group 402 in a different way.

Figure 1:
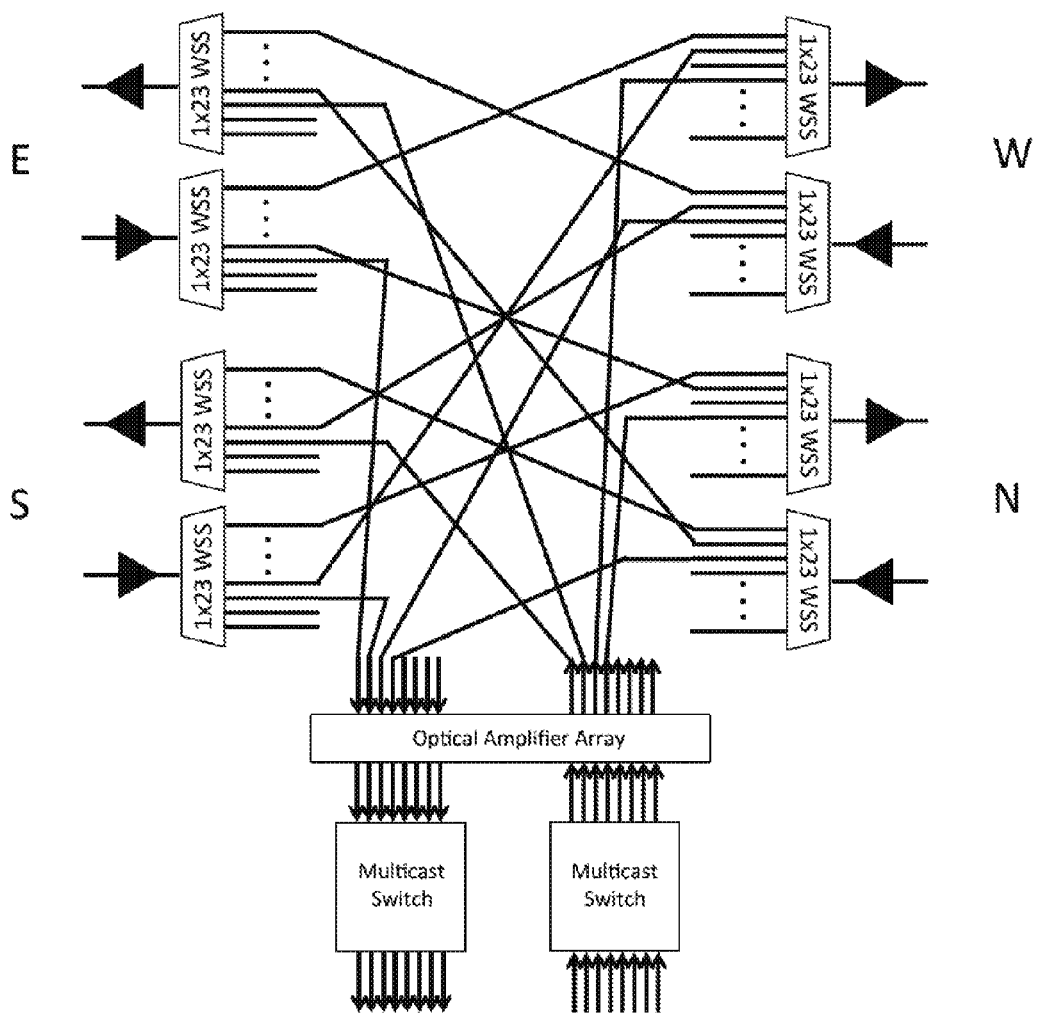
FIG. 1 is a block diagram illustrating an optical switching device using MCS and optical amplifier array.

In one embodiment, a contentionless WXC module, as illustrated in FIG. 2, can be used, e.g., for signal channel adding and dropping. For example, a contentionless WXC module disclosed herein can replace the entire MCS and EDFA arrays as shown in FIG. 1. Such a contentionless WXC module can perform with a smaller insertion loss and a lower cost, than the MCS and EDFA combination shown in FIG. 1. Electric power consumption is also greatly reduced by using the contentionless WXC module as disclosed.

Figure 5:
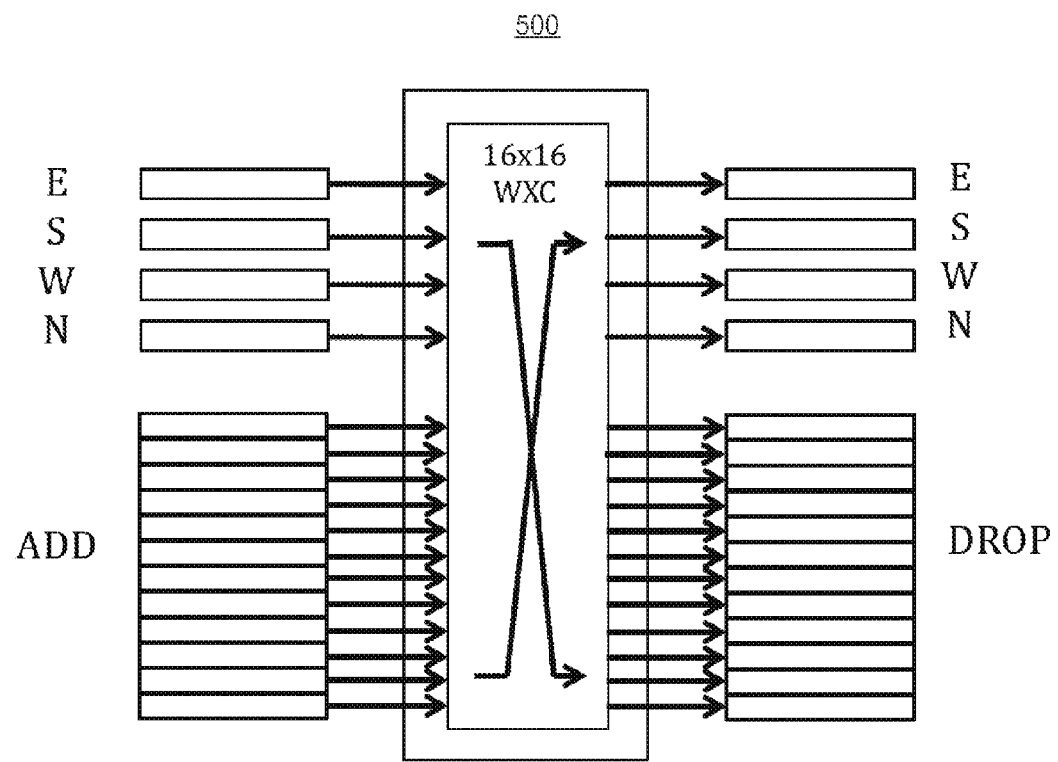
FIG. 5 is a block diagram illustrating a reconfigurable optical add-drop multiplexer (ROADM) realized by a contentionless WXC module.

In yet another embodiment, a contentionless WXC module with bigger port numbers, can serve as the entire ROADM architecture, as shown in FIG. 5. FIG. 5 illustrates a 4 degree reconfigurable optical add-drop multiplexer (ROADM) realized by a 16×16 contentionless WXC module, according to at least one embodiment. Some input and output ports of the 16×16 WXC module 500 serve for routing and selecting optical signals in 4 degrees (E, S, W and N); while other input and output ports of the module 500 provide dropping and adding optical signals.

In yet another embodiment, a contentionless WXC module with bigger port numbers, can serve as the entire ROADM architecture, as shown in FIG. 5. FIG. 5 illustrates a 4 degree reconfigurable optical add-drop multiplexer (ROADM) realized by a 16×16 contentionless WXC module, according to at least one embodiment. Some input and output ports of the 16×16 WXC module 500 serve for routing and selecting optical signals in 4 degrees (E, S, W and N); while other input and output ports of the module 500 provide dropping and adding optical signals.

Compared to the structure using WSS in FIG. 1, a single WXC module 500 replaces 8 pieces of very expensive 1×23 WSS (or four Twin WSS), and the costly Optical Amplifier Array and Multi Cast Switch combo. Fiber connections between WSS modules are no longer needed either. This design improves the insertion loss greatly since the overall insertion loss (IL) will only come from the IL of WXC itself, typically less than 9 dB. The cost of the entire ROADM architecture is reduced tremendously since it has much less components and modules.

The WXC module 500 also has less electronic power consumption because a single WXC module replaces all those individual WSS modules, EDFA array and MCS. The add and drop side of the device also has wide bandwidth so that the corresponding transponders can be less expensive. Also, drop wavelength is tunable and completely colorless. In addition, the physical size of the entire ROADM architecture will be much smaller too, changed from big cabin into small case since fewer slots are needed.

Similarly to the WXC module illustrated in FIG. 2, a N×M WXC module 500 can comprise N input collimators for collimating input optical beams; M output collimators for collimating output optical beams; N input wavelength dispersive elements; M output wavelength dispersive elements; and a cross connect assembly. Each of the N input wavelength dispersive elements can separate by diffraction one of the input optical beams into L split optical beams at L wavelength channels.

The cross connect assembly includes at least N×L incoming ports, multiple transmissive active switching elements, and at least M×L outgoing ports. Each of the N×L incoming ports belongs to one of the L wavelength channels, and each of the M×L outgoing ports belongs to one of the L wavelength channels. The N×L input port receives the N×L split optical beams from the N input wavelength dispersive elements.

The transmissive active switching elements are configured to dynamically control optical paths between the N×L incoming ports and the M×L outgoing ports such that anyone of the incoming ports of an individual wavelength channel of the L wavelength channels can establish an optical path with anyone of the outgoing ports of the individual wavelength channel at a moment.

Each of the M output wavelength dispersive elements receives L split optical beams from some of the M×L outgoing ports and combines the L received split optical beams into one of the output optical beams. An output optical beam can contain split optical beams from more than one different input optical beams.

The WXC module 500 can further comprise incoming optical lens for guiding the split optical beams from the input wavelength dispersive elements to the incoming ports of the cross connect assembly; and outgoing optical lens for guiding the split optical beams from the outgoing ports of the cross connect assembly to the outgoing wavelength dispersive elements.

In some embodiments, the input wavelength dispersive elements can form a single input wavelength dispersive component, and the output wavelength dispersive elements can form a single input wavelength dispersive component.

As the WXC module 500 is contention less, the split optical beams of a particular wavelength channel can transport in the cross connect assembly without interference by other split optical beams of the particular wavelength channel.

The transmissive active switching elements can comprise, e.g., active liquid crystal based polarization grating cells; passive liquid crystal mesogen polarization grating cells; birefringent crystals; or combination thereof. The transmissive active switching elements can comprise, e.g., active matrix thin-film transistor liquid crystal cells. The cross connect assembly may further includes attenuation components for attenuating the split optical beams.

The WXC module 500 can further comprise polarization diverse elements for polarizing the input optical beams and beam expansion units for expanding beam angles of the input optical beams.

Figure 6:
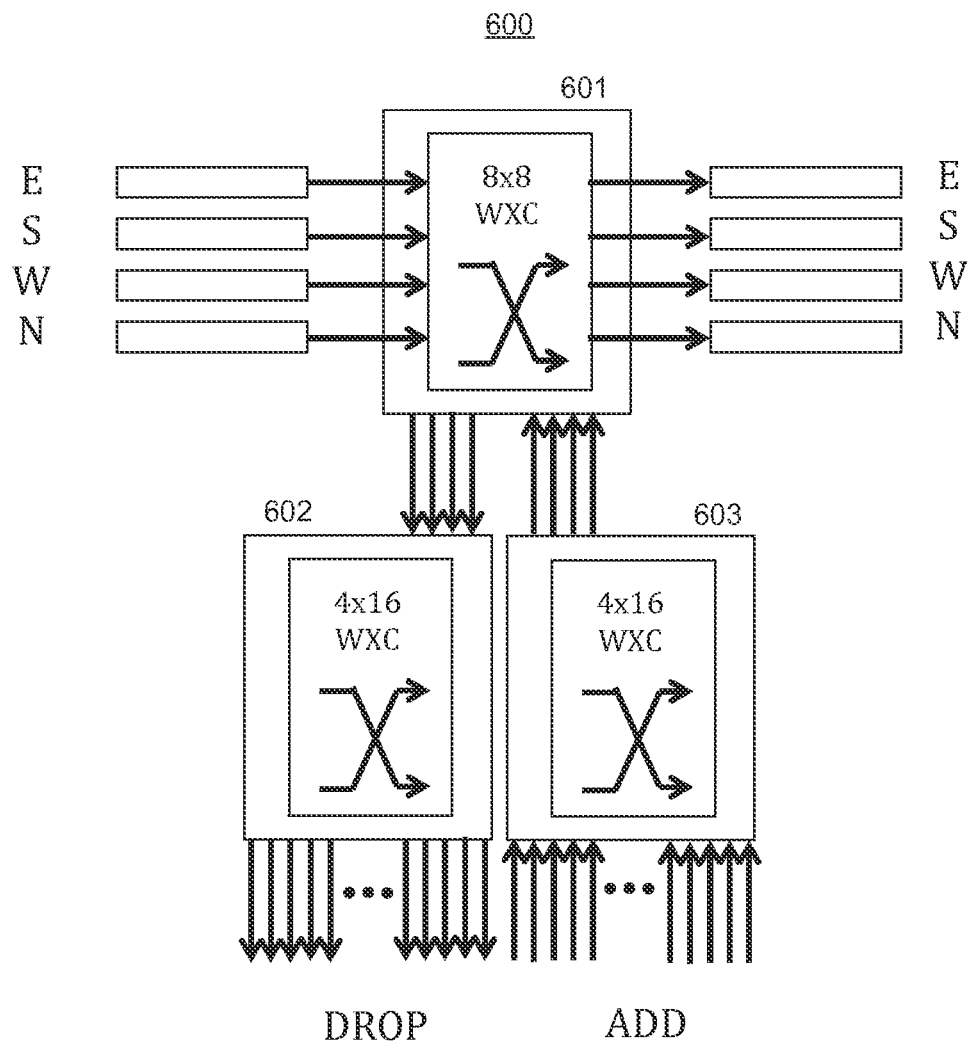
FIG. 6 is a block diagram illustrating a reconfigurable optical add-drop multiplexer (ROADM) realized by multiple contentionless WXC modules.

Although FIG. 5 illustrates a single WXC for the functionalities of a ROADM device, such a ROADM device can also be implemented by multiple WXC modules. FIG. 6 is a block diagram showing a reconfigurable optical add-drop multiplexer (ROADM) realized by multiple contentionless WXC modules, according to at least one embodiment. As shown in FIG. 6, an 8×8 WXC module 601 is used to replace the route and select portion of the ROADM as shown in FIG. 1. Two 4×16 WXC modules 602 and 603 are used to replace the add and drop portion of the ROADM as shown in FIG. 1.

Figure 7:
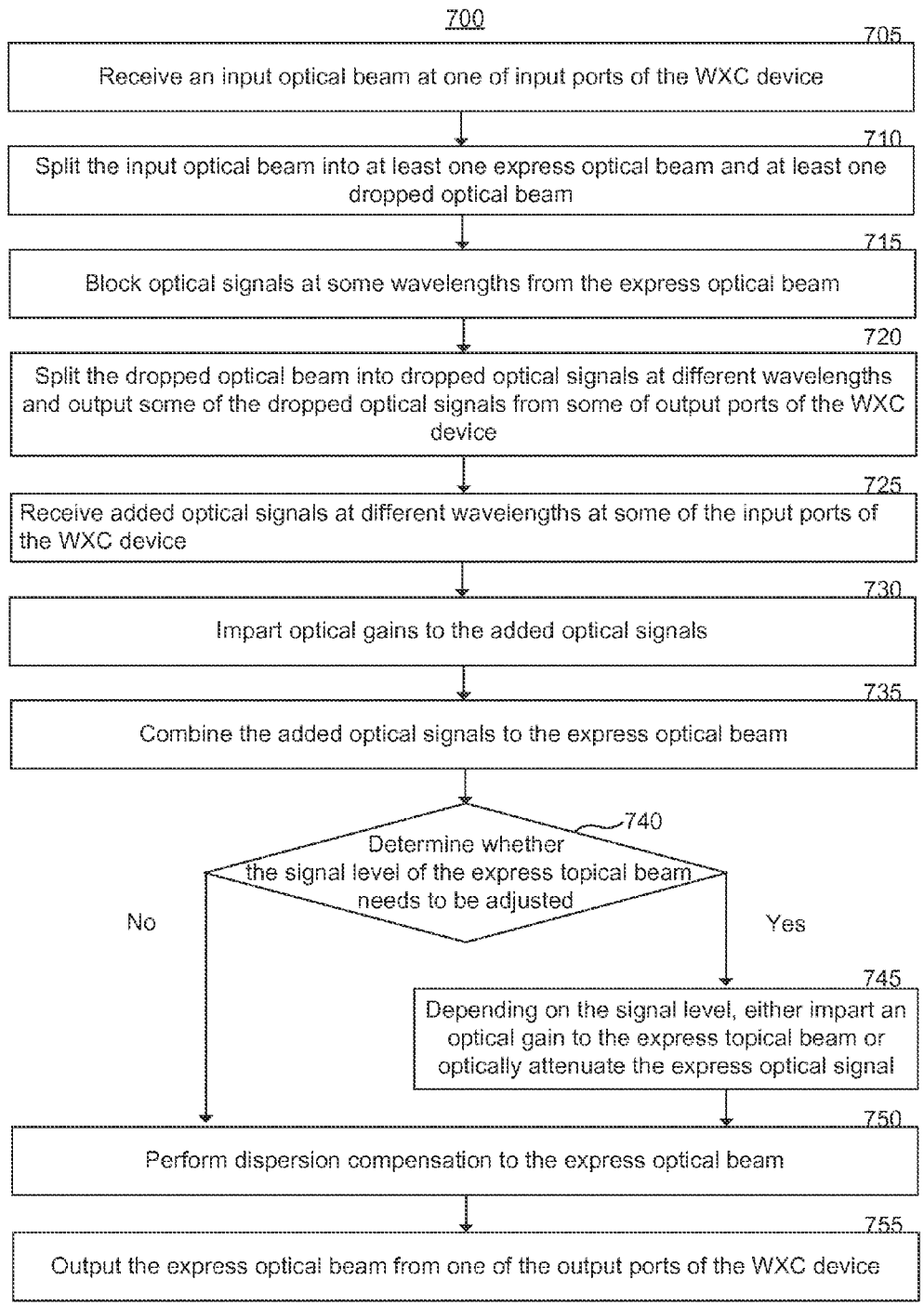
FIG. 7 is a flow diagram showing a process for performing functionalities of a reconfigurable optical add-drop multiplexer (ROADM) using a wavelength cross connect (WXC) device.

FIG. 7 is a flow diagram showing a process for performing functionalities of a reconfigurable optical add-drop multiplexer (ROADM) using a wavelength cross connect (WXC) device, according to at least one embodiment. The process 700 starts at step 705, wherein a WXC device receives an input optical beam at one of input ports of the WXC device. At step 710, the WXC device splits the input optical beam into at least one express optical beam and at least one dropped optical beam. Then at step 715, the WXC device blocks optical signals at some wavelengths from the express optical beam.

Continuing at step 720, the WXC device splits the dropped optical beam into dropped optical signals at different wavelengths and outputs some of the dropped optical signals from some of output ports of the WXC device.

At step 725, the WXC device receives added optical signals at different wavelengths at some of the input ports of the WXC device. At step 730, the WXC device imparts optical gains to the added optical signals if necessary. Then at 735, the WXC combines the added optical signals to the express optical beam.

Continuing at decision step 740, the WXC device determines whether the signal level of the express topical beam needs to be adjusted. If so, at step 745, the WXC device either imparts an optical gain to the express topical beam, or optically attenuates the express optical signal, depending on the signal level. If the signal level of the express topical beam does not need to be adjusted, the process 700 directly continues to step 750.

At step 750, the WXC device performs dispersion compensation to the express optical beam if necessary. At step 755, the WXC device outputs the express optical beam from one of the output ports of the WXC device.

Those skilled in the art will appreciate that the logic illustrated in FIG. 7 and described above, may be altered in a variety of ways. For example, the order of the logic may be rearranged, substeps may be performed in parallel, illustrated logic may be omitted, other logic may be included, etc. For example, the WXC device can outputs the dropped optical signals and combined express optical beams simultaneously.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

What is claimed is:

1. A wavelength cross connect (WXC) device comprising:
   N input ports for receiving input optical beams;
   M output ports for transmitting output optical beams;
   N input wavelength dispersive elements, each of the N input wavelength dispersive elements separating by diffraction one of the input optical beams into L split optical beams at L wavelength channels;
   a cross connect assembly having at least N×L incoming ports, multiple transmissive active switching elements, and at least M×L outgoing ports, wherein each of the N×L incoming ports belongs to one of the L wavelength channels, and each of the M×L outgoing ports belongs to one of the L wavelength channels, wherein the cross connect assembly includes attenuation components for attenuating the split optical beams;
      the N×L input port receiving the N×L split optical beams from the N input wavelength dispersive elements;
      the transmissive active switching elements configured to dynamically control optical paths between the N×L incoming ports and the M×L outgoing ports by dynamically changing directions of the optical paths such that anyone of the incoming ports of an individual wavelength channel of the L wavelength channels can establish an optical path within a common horizontal wavelength plane with anyone of the outgoing ports of the individual wavelength channel at a moment, wherein for an individual wavelength channel among the L wavelength channels, the split optical beams of the individual wavelength channel have a common wavelength and travel in a common horizontal wavelength plane corresponding to the individual wavelength channel; and
   M output wavelength dispersive elements, each of the M output wavelength dispersive elements receiving L split optical beams from some of the M×L outgoing ports and combining the L received split optical beams into one of the output optical beams.

2. The wavelength cross connect device of claim 1, wherein the input wavelength dispersive elements form a single input wavelength dispersive component, and the output wavelength dispersive elements form a single input wavelength dispersive component.

3. The wavelength cross connect device of claim 1, wherein the split optical beams of a particular wavelength channel transport in the cross connect assembly without interference by other split optical beams of the particular wavelength channel.

4. The wavelength cross connect device of claim 1, further comprising:
   incoming optical lens for guiding the split optical beams from the input wavelength dispersive elements to the incoming ports of the cross connect assembly; and
   outgoing optical lens for guiding the split optical beams from the outgoing ports of the cross connect assembly to the outgoing wavelength dispersive elements.

5. The wavelength cross connect device of claim 1, wherein the transmissive active switching elements comprises active liquid crystal based polarization grating cells.

6. The wavelength cross connect device of claim 1, wherein the transmissive active switching elements comprises combinations of active liquid crystal based polarization grating cells and passive liquid crystal mesogen polarization grating cells.

7. The wavelength cross connect device of claim 1, wherein the transmissive active switching elements comprises birefringent crystal.

8. The wavelength cross connect device of claim 1, wherein the transmissive active switching elements comprises active matrix thin-film transistor liquid crystal cells.

9. The wavelength cross connect device of claim 1, wherein the N input ports comprise collimators for collimating the input optical beams, and the M output ports comprise collimators for collimating the output optical beams.

10. An optical switching device comprising:
    multiple input wavelength dispersive elements, each of the input wavelength dispersive elements receiving an input optical beam and splitting the input optical beam into multiple split optical beams of different wavelengths;
    beam expansion units for expanding beam angles of the input optical beams;
    a cross connect assembly including multiple rows of incoming ports, each row of incoming ports including a plurality of incoming ports, wherein for each individual wavelength of the different wavelengths, the split optical beams of the individual wavelength from the input wavelength dispersive elements reach a row of incoming ports corresponding to the individual wavelength by travelling in a horizontal wavelength plane corresponding to the individual wavelength;
    the cross connect assembly further including active switching elements and multiple rows of outgoing ports, each row of outgoing ports including a plurality of outgoing ports, wherein the active switching elements configured to dynamically establish at least one optical path within the horizontal wavelength plane between an incoming port within the row of incoming ports corresponding to the individual wavelength and an outgoing port within a row of output ports corresponding to the individual wavelength by dynamically changing directions of optical paths of the split optical beams; and
    multiple output wavelength dispersive elements, each of the output wavelength dispersive elements combining some of the split optical beams into an output optical beam.

11. The optical switching device of claim 10, wherein the output optical beam contain split optical beams from more than one different input optical beams.

12. The optical switching device of claim 10, further comprising:
    input collimators for collimating the input optical beams; and
    output collimators for collimating the output optical beams.

13. The optical switching device of claim 10, further comprising:

polarization diverse elements for polarizing the input optical beams.

14. The optical switching device of claim 10, wherein the active switching elements comprise transmissive active switching elements.

15. The optical switching device of claim 10, wherein the active switching elements comprise at least one reflective active switching elements.

* * * * *